United States Patent [19]

Mitamura

[11] Patent Number: 4,945,498
[45] Date of Patent: Jul. 31, 1990

[54] CAD/CAM PLOTTING SYSTEM BY ONE-STROKE SKETCHING

[75] Inventor: Kazuhiro Mitamura, Fujisawa, Japan
[73] Assignee: Nissan Motor Co., Ltd., Yokohama, Japan
[21] Appl. No.: 310,132
[22] Filed: Feb. 14, 1989
[30] Foreign Application Priority Data Feb. 17, 1988 [JP] Japan .................................. 63-32812

[51] Int. Cl.⁵ .............................................. G06F 3/14
[52] U.S. Cl. ..................................... 364/521; 364/518
[58] Field of Search ............................... 364/518–520, 364/521; 340/706

[56] References Cited

U.S. PATENT DOCUMENTS

4,513,374  4/1985  Hooks ................................. 364/200
4,855,939  8/1989  Fitzgerald, Jr. et al. ........... 364/522

Primary Examiner—Arthur G. Evans
Attorney, Agent, or Firm—Foley & Lardner, Schwartz, Jeffery, Schwaab, Mack, Blumenthal & Evans

[57] ABSTRACT

In a CAD/CAM plotting system, graphic data relating to an object to be plotted is sequentially input in accordance with instruction of a CAD/CAM program so as to plot a desired shape of the object on a display screen. A schematic outline of the object is one-stroke-sketched on the display screen. The sketched outline of the object is processed in the pattern recongnition and data analysis. Thereafter, coordinate points of the processed outline corresponding to correct dimension values of the object are determined by inputting a minimum number of dimension values thereof. Finally, the processed outline is automatically corrected with the correct dimension values based upon the determined coordinate points.

9 Claims, 6 Drawing Sheets

CAD/CAM PLOTTING SYSTEM BY ONE-STROKE SKETCHING

BACKGROUND OF THE INVENTION

1. Field of the Invention

The present invention generally relates to a plotting system for plotting an object to be plotted by utilizing a computer-aided design (CAD). More specifically, the present invention is directed to a plotting method by way of a sketch input suitable for designing a die or mold in use of CAD/CAM (computer-aided design-/computer-aided manufacturing system).

2. Description of the Related Art

To plot an object such as parts of an automobile on a monitor by utilizing a so-called "CAD (computer-aided design)" or "CAM (computer-aided manufacturing system)", various types of CAD/CAM plotting systems have been developed and commercially available. In the typical CAD plotting system, an operator initializes the CAD system to execute the plotting operation, e.g., a name of a plotted shape, a contraction scale, a position of an origin, a size of a technical drawing and the like. Thereafter, the operator manipulates a keyboard, a tablet, and a stylus pen so as to select various commands of the CAD language based upon instructions of a previously stored program, and thus to input various necessary data into the computer in the interactive mode, and also confirm the input data on the monitor.

As the conventional plotting systems, there are three typical plotting processes:

(1) In the first plotting process, all of the coordinate points are input through, e.g., the keyboard into the computer and displayed on the monitor, and then these coordinate points are connected by line segments, arcs and the like.

(2) In the second plotting process, all of the line segments, arcs, coordinate points and the like for constituting the shape of the object to be plotted are input so as to erase the unnecessary portions displayed on the monitor.

(3) In the third plotting method, the shape or pattern of the object to be plotted is searched from the previously plotted shapes, or patterns registered in the computer, taking account of the similarities, and thereafter the selected shape or pattern is copied in the memory of the computer. Then, corrections are partially made in the copied shape or pattern.

When the plotting process is completed, the subsequent plotting output process is performed. The graphic data are temporarily stored in the memory unit of the computer, and the desired shape of the object is plotted based upon the graphic data.

The above-described conventional CAD/CAM plotting systems are described in, for instance, "NIKKEI MECHANICAL" issued on July 30, 1984, pages 98 to 105.

Since such a graphic (plotting) data input operation of the shape/pattern relating to the object to be plotted is carried out by utilizing the CAD language in the conventional CAD/CAM plotting system, the following drawbacks are provided. That is, when plotting a drawing having a complex shape by the CAD system, the complex CAD operations are necessarily required. In other words, only skilled CAD operators can input such a complex plotting data. Otherwise, a lengthy plotting data input time is needed by a normal CAD operator, as compared with the hand-writing sketch method of the CAD system. More particularly, in the CAD plotting system employing a so-called "personal computer", a data capacity is considerably smaller than that of the powerful computer for CAD plotting system, and an amount of CAD language (commands) is also small. Accordingly, the CAD operabilities of the personal computer CAD plotting system are very degraded, which impedes the development of the CAD plotting systems employing small-scaled computers.

These problems belonging to the conventional CAD plotting systems are particularly enhanced in designing a die or mold by utilizing the conventional CAD/CAM plotting systems. That is, when designing a die or mold, only the above-described first and second plotting processes are utilized, because the number of similar die patterns is rather small. If the above-described third plotting process is utilized for designing a die or mold, all of the CAD-designed die patterns must be registered in the memory unit of the CAD plotting system, resulting in huge amounts of cost. Accordingly, this third plotting process is not a practical solution.

SUMMARY OF THE INVENTION

The present invention has been made in an attempt to solve the above-described conventional drawbacks, and therefore, has an object to provide a plotting system of a computer-aided design/computer-aided manufacturing system utilizing the one-stroke-sketch data input method. Moreover, another object of the invention is to provide a novel plotting method of CAD/CAM system introducing the one-stroke-sketch data input method suitable for designing a die or mold.

A CAD/CAM plotting system, according to the invention, wherein graphic data relating to an object to be plotted is sequentially input in accordance with instructions of a CAD/CAM program so as to plot a desired shape of the object on a display screen, is characterized by comprising:

means for one-stroke-sketching a schematic outline of the object as the graphic data on the display screen;

means for pattern-recognizing the sketched schematic outline;

means for data-analyzing the pattern-recognized schematic outline;

means for determining coordinate points of said data-analyzed outline corresponding to correct dimension values of the object by inputting a predetermined number of dimension values; and, means for automatically correcting the data-analyzed schematic outline with the correct dimension values based upon the determined coordinate points.

Also, CAD/CAM (computer-aided design/computer-aided manufacturing) plotting method, according to the invention, wherein graphic data relating to an object to be plotted is sequentially input in accordance with instructions of a CAD/CAM program so as to plot a desired shape of the object on a display screen, is characterized by comprising the steps of:

one-stroke-sketching a schematic outline of the object as the graphic data on the display screen;

pattern-recognizing the one-stroke-sketching outline of the object;

data-analyzing the pattern-recognized outline of the object;

determining coordinate points of the data-analyzed outline corresponding to correct dimension values of the object by inputting a predetermined number of dimension values thereof; and, automatically correcting the data-analyzed outline of the object with the correct dimensions based upon the determined coordinate points.

In accordance with the CAD/CAM plotting system according to the invention, the simple CAD operabilities can be achieved by employing the one-stroke-sketch input method. Accordingly, any non-skilled CAD/CAM operators can readily operate this plotting system particularly in the die CAD designing.

BRIEF DESCRIPTION OF THE DRAWINGS

The present invention is best understood with reference to the following specification in conjunction with the accompanying drawings, in which.

DETAILED DESCRIPTION OF THE PREFERRED EMBODIMENTS

ARRANGEMENT OF SKETCH-INPUT TYPE CAD/CAM PLOTTING SYSTEM

Figure 1:
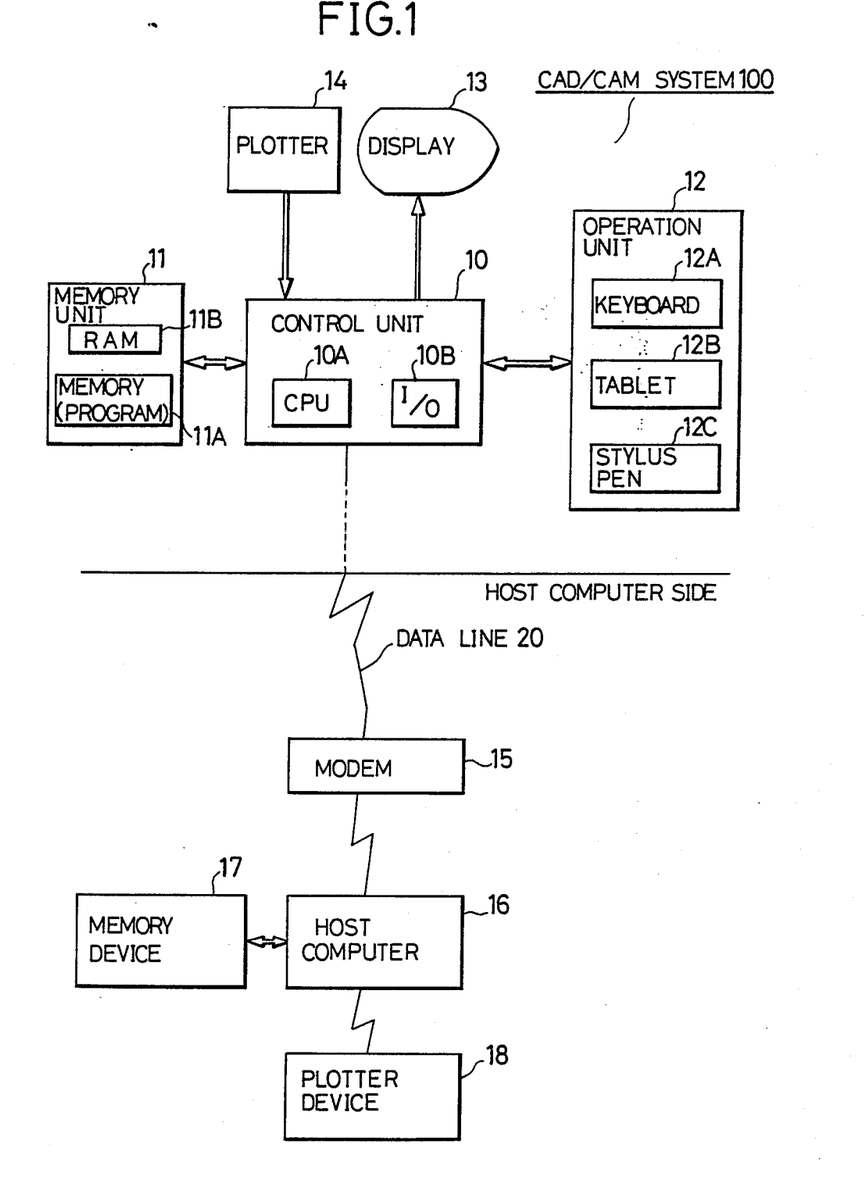
FIG. 1 is a schematic block diagram of a sketch-input type CAD/CAM plotting system according to a preferred embodiment of the invention.

Referring now to FIG. 1, an arrangement of a sketch-input type CAD/CAM plotting system 100 according to a preferred embodiment of the invention will be described.

This plotting system 100 is mainly arranged by a control unit 10, a memory unit 11, an operation unit 12, a display 13 and a plotter 14. The control unit 10 includes a central processing unit (CPU) 10A and an input/output port (I/0) 10B. The memory unit 11 includes a memory for previously storing a CAD/CAM program, and a random access memory (RAM) 11B for temporarily storing the data entered by the operation unit 12 and also the CAD processed data. The operation unit 12 includes a keyboard 12A for entering, e.g., a size of a mold to be plotted; a tablet 12B for entering a position of a point with respect to a matrix system; and a stylus pen 12C for positioning a portion of a shape to be plotted on the display 13.

If the plotting system 100 according to the preferred embodiment is required to be operated under a powerful computer, the control unit 10 may be connected to a host computer 16. As shown in FIG. 1, CPU 10A of the control unit 10 is connected via the input/output port 10B, a data communication line 20, and a modem 15 to the host computer 16. This host computer 16 is also connected to a memory device 17 and a plotter device 18. This memory device 17 may be constructed of an optical data storage disk apparatus.

PLOTTING METHOD

A detailed plotting operation in the above-described sketch input type CAD/CAM plotting system 100 will now be described with reference to FIGS. 2 and 3.

Figure 2A:
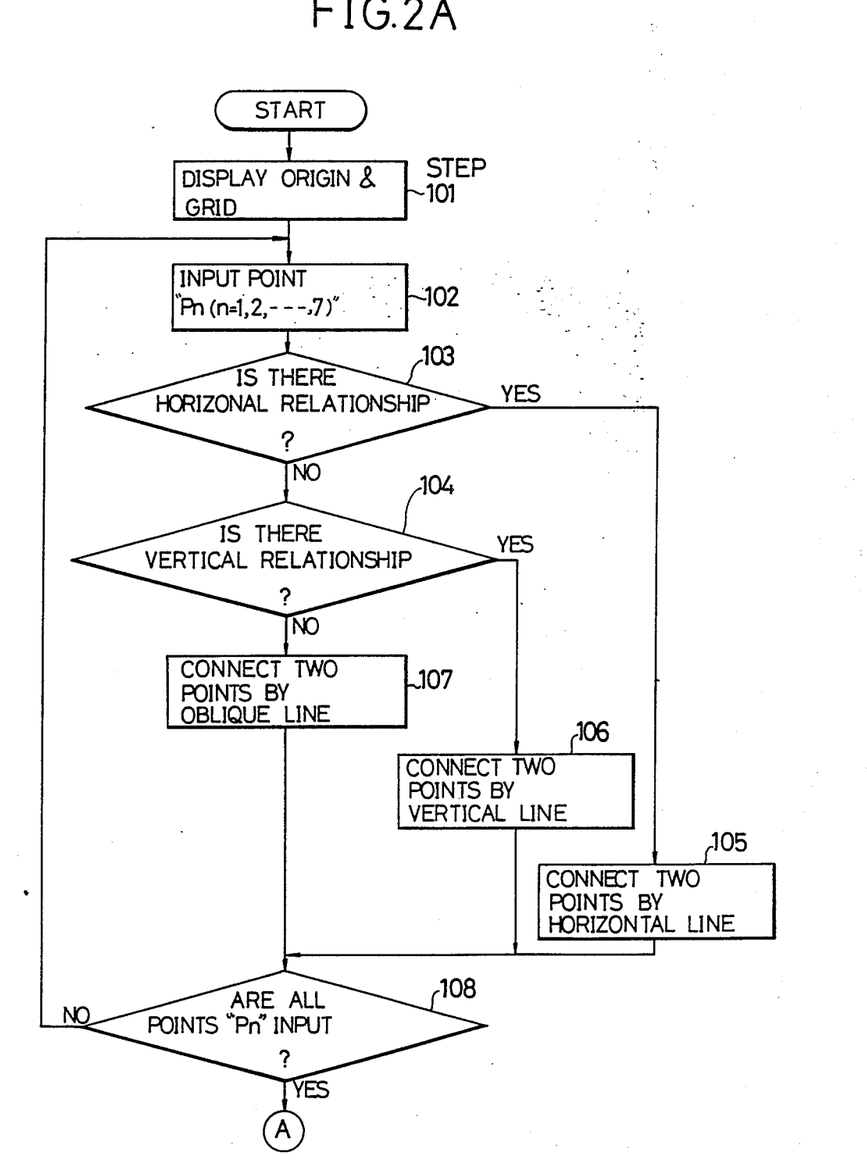
FIG. 2A, 2B & 2C are a flowchart for explaining the plotting operations of the CAD/CAM plotting system according to the preferred embodiment.
Figure 2B:
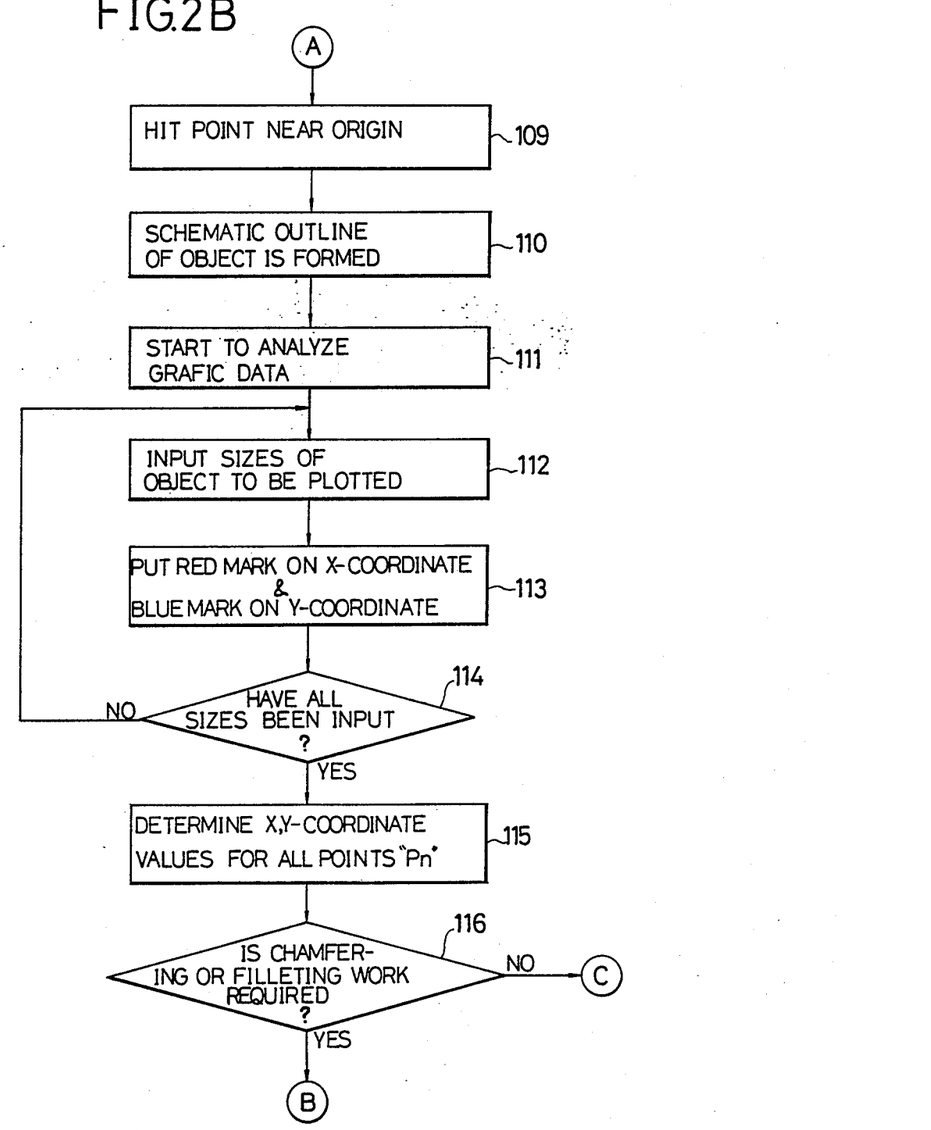
Figure 2C:
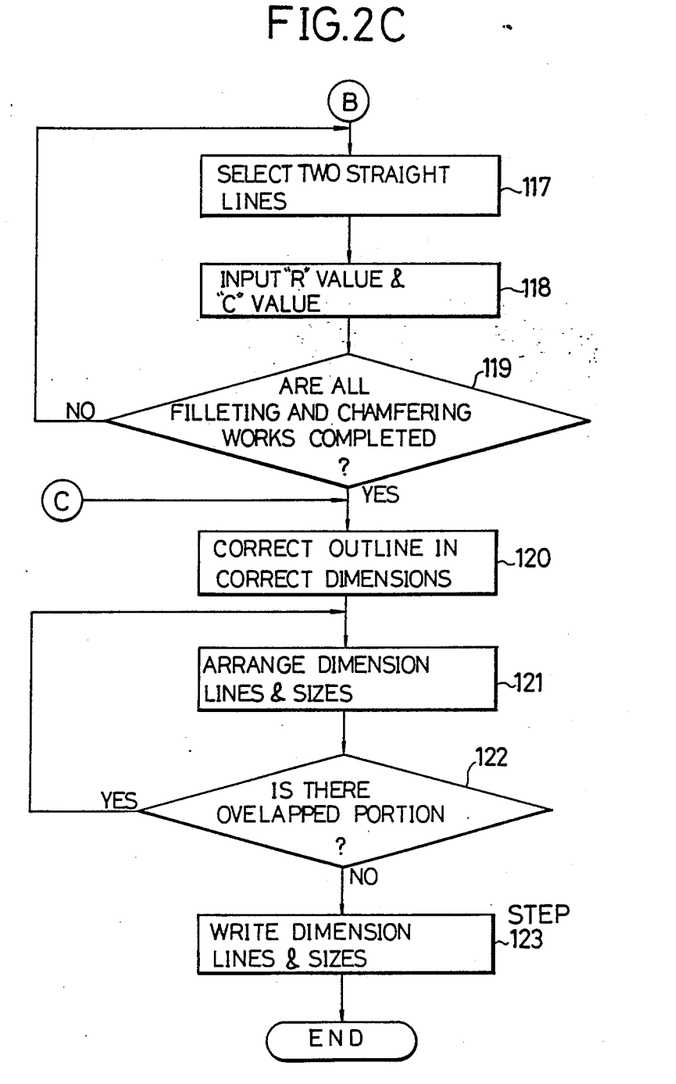
Figure 3:
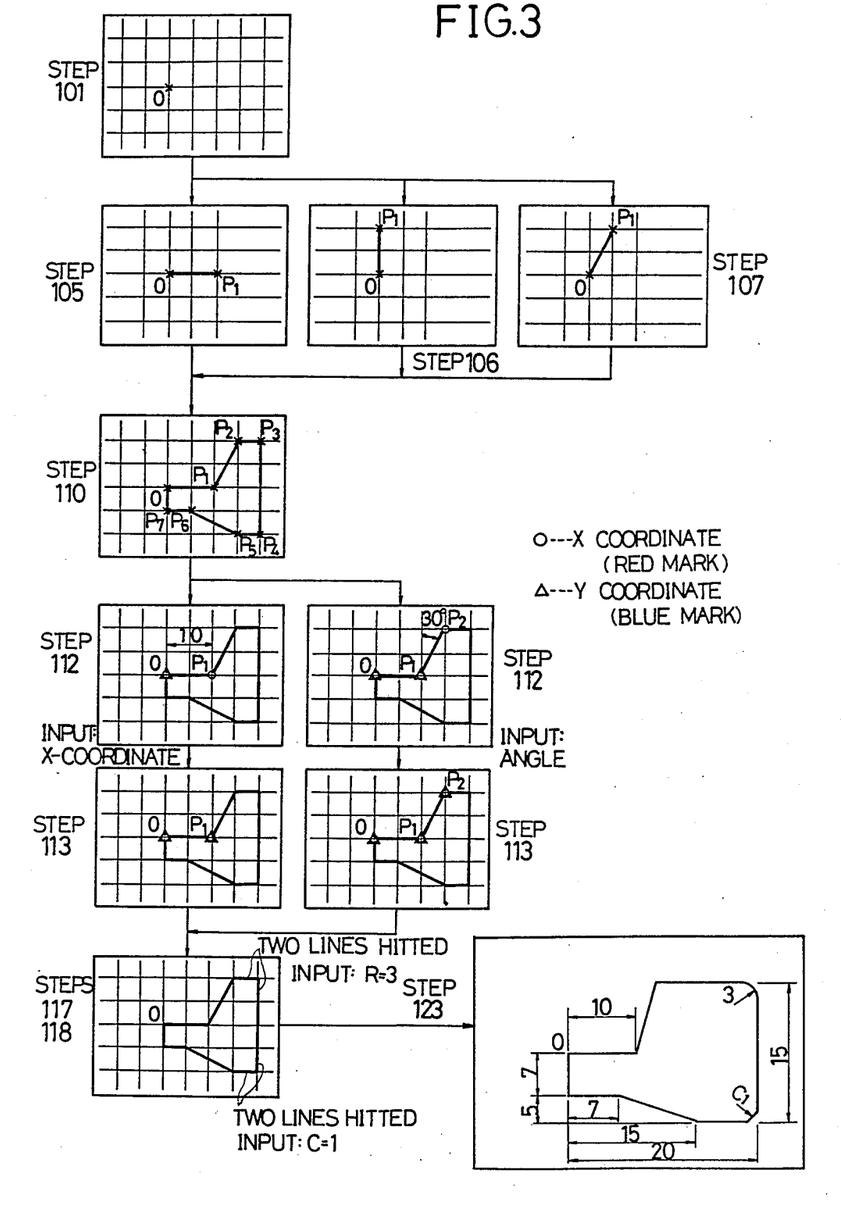
FIG. 3 schematically illustrates the major plotting steps of the flowchart shown in FIG. 2.

FIG. 2 is a flowchart for explaining the plotting operations according to the preferred embodiment, and FIG. 3 illustrates major plotting examples.

When the proper commands are selected so as to execute the CAD/CAM plotting system 100, as previously described, an origin "O" (a starting point of plotting operations) and also a grid having an interval of, e.g., 4 mm are displayed on the screen of the display 13 (see a step 101 of FIGS. 2 and 3). It should be noted that this grid has an auxiliary plotting function. That is, when an arbitrary point on the display screen is selected, a cross point of the grid which is the most nearest point from the grid is selected accordingly. The interval of this grid may be freely selected and also the following plotting operations may be performed without utilizing the grid.

Thereafter, when the stylus pen 12C (see FIG. 1) is moved on the tablet 12B (see FIG. 1), a cross cursor is displayed on the display screen. Under this condition, while observing the positional relationship between the origin "O" and a new point "$P_n$ (n=1,2,3,---,7)" to be decided for the plotting operation, this new point "$P_n$ (n=1,2,3,---,7)" is input by first hitting this point "$P_1$" on the tablet 12B by the stylus pen 12C (step 102). According to the processing operation by the control unit 10, the positional relationship between the origin "O" and input point "$P_1$" is investigated. That is, if the positional relationship between these points "O" and "$P_1$" is horizontal, these two points are connected by a horizontal line (step 105). If there is a vertical positional relationship between these two points "O" and "$P_1$", then these points are connected by a vertical line (step 106). If there is neither horizontal nor vertical positional relationship between two points, these points are connected by an inclined, or oblique line (step 107). Then, the subsequent point "$p_2$" is similarly input on the tablet 12B by the stylus pen 12C (step 102). The newly input point "$P_2$" and the previously input "$P_1$" are connected by the properly selected line.

In a step 108, a check is made whether or not all of the points "$P_1$" to "$P_7$" have been input. If yes, then the subsequent process is executed. That is, a position located adjacent to the origin "O" at ½ interval of the grid, i.e., within approximately 2.5 mm in the preferred embodiment, is hit by the stylus pen 12C on the display screen (step 109). As a result, a schematic outline of the object to be plotted can be formed (step 110).

In the next step 111, the data analysis is carried out by the control unit 10 based upon the coordinate positions of all of the input points "$P_n$". Namely, a definition is made on the positional relationship between one point "$P_n$" and another point "$P_{n-1}$". *Precisely speaking, if the second point "$P_{n-1}$" is positioned at the upper right position in the oblique direction with respect to the first point "$P_n$"*, the coordinate position thereof is, for instance, defined by (1,1). Similarly, if the second point is positioned at the left position in the horizontal direction from the second point "$P_n$", the coordinate position thereof is defined by (−1,0). Also, if the second point "$P_{n-1}$" is located normal to the first point "$P_n$", the coordinate position thereof is defined by (0,−1). A data table in which all of the points "$P_n$" input in the above-described input order have been arranged, is formed and then stored in RAM 11B of the memory unit 11. In the subsequent step 112, the sizes of the object to be plotted on the screen are input by hitting by the stylus pen 12C the points and line segments to be input.

With regard to the size input operations, there are two input ways: the coordinate position input in the X and Y directions, and the angle data input. In particular, this X, Y coordinate input operation contains a first method for inputting an absolute coordinate position ($X_a$, $Y_a$) with respect to the origin "O", and a second method for inputting the length of the line segment between these two points by utilizing the positional relationship such as the vertical, or horizontal relationship which has been analyzed in the previous step 111. In other words, this second method is to input only one of the X and Y coordinate positions so as to determine the desired coordinate positions. On the other hand, the angle data input method includes a third method for inputting both three coordinate values within the X and Y coordinate positions of both end points of the oblique line segment, and also the inclined angle (0–90 degrees) of the line segment with respect to the Y axis, so as to determine the remaining X or Y coordinate value; and a fourth method for inputting the respective X and Y coordinate values of the end points of two oblique line segments, and also the inclined angles ($\theta_1$, $\theta_2$) of these line segments with respect to the Y axis in order to determine the X and Y coordinate values of the cross point made by these two line segments.

The above-described dimension (size) input operation can be easily executed in accordance with the input order instructed on the display screen by an operator, since the size input order is automatically produced by the program previously stored in the memory 11A of the memory unit 11 under the control of the control unit 10.

In the subsequent step 113, a red mark is put on the X coordinate of the input point and a blue mark is given on the Y coordinate thereof while observing these red and blue marks, an operator continues to input the remaining size values until all of the input points have been marked (step 114). When such a marking operation is completed, the coordinate points for all of the points constituting the object to be plotted can be determined (step 115). It should be understood that the above-described CAD/CAM plotting process defined by the steps 112 to 114 is so-called as "a sequential dimension checking", and the CAD/CAM plotting system according to the preferred embodiment controls the input sequence of the dimensions so that an operator can observe excess dimension-inputs and also no determination on correct coordinate values.

Then, based upon the coordinate values thus acquired, the dimensions of the plotted shape are corrected by the correct dimensions in case that neither chamfering work, nor filleting work is required for the object to be plotted (step 116 and 120). To the contrary, if either chamfering work, or filleting work is required, two straight lines in question displayed in the display screen are hit by the stylus pen 12C in order to select the two straight lines to be processed (steps 116 and 117), whereby values of "R (angle)" and "C (corner)" are input (step 118).

When all of the above-described chamfering and/or filleting works are completed, the dimensions of the shape displayed on the screen are corrected in the correct dimensions (step 119 and 120). Thereafter, based upon the data acquired in the previous steps 112 and 115, both the dimension lines and dimension sizes are automatically arranged on the display screen (step 121). In the next step 122, an operator visually checks whether or not there is an overlapped portion. If yes, then both the dimension lines and sizes are rearranged in the previous step 121. To the contrary, if no overlapped portion appears in the display screen, both the dimension lines and sizes are written in a step 123. Thus, the CAD/CAM plotting operation is accomplished.

While has been described above, the features of the CAD/CAM plotting system according to the preferred embodiment are such that the CAD plotting data can be input by the angles, and furthermore the total number of the input lines of the coordinate values can be reduced. As a consequence, the CAD plotting workability can be considerably improved. Also, since the dimensions of the X-coordinate or Y-coordinate can be independently checked by means of the above-described "sequential dimension checking", precision of the plotting operation can be greatly improved.

PLOTTING EXAMPLE

For a better understanding of the plotting system 100 according to the invention, one plotting example will now be described with reference to FIG. 4.

Figure 4:
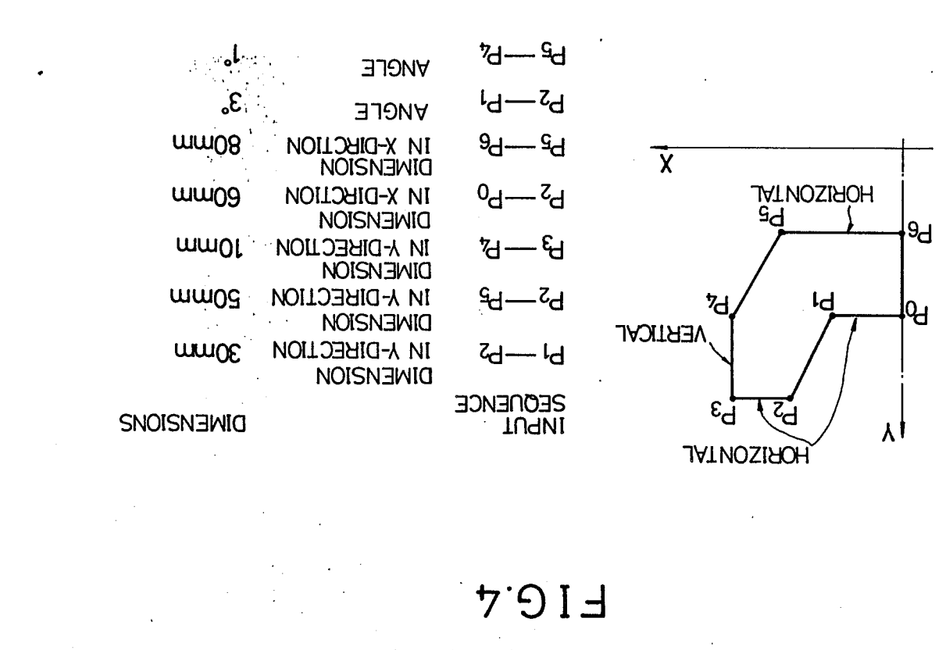
FIG. 4 schematically illustrates a plotting example according to the plotting system shown in FIG. 1.

FIG. 4 shows an outline of a shape to be plotted.

As previously described, since the input dimension values and the data input order have been stored in RAM 11B shown in FIG. 1, the absolute coordinate values of each of the points "$P_0$" through "$P_6$" can be calculated based upon the data input order and dimension values in accordance with the invention. Both the data input order and dimension values are also illustrated in FIG. 4.

The calculation sequence is as follows:

(1) $P_0 = (0, 0)$ (2) Since the positional relationship between ($P_0$-$P_1$) is horizontal, $P_1 = (*, 0)$ $P_2 = (*, +30)$, where mark * indicates "not yet calculated".

(3) Since the positional relationship between ($P_2$-$P_3$) is also horizontal, $P_2 = (*, +30)$ $P_5 = (*, -20)$.

(4) As the positional relationship between ($P_6$ - $P_5$) is similarly horizontal, $P_6 = (0, -20)$ --- calculated $P_4 = (*, +20)$ $P_2 = (+60, +30)$ --- calculated $P_5 = (+80, -20)$ --- "

$P_1 = (+58.43, 0)$ --- "

$P_4 = (+80.70, +20)$ --- ".

(5) Since the positional relationship between ($P_4 P_3$) is vertical, $P_3 = (+80.70, +30)$ --- calculated.

MODIFICATION

The CAD/CAM plotting system according to the invention may be modified.

Executing the above-described CAD/CAM plotting method two times, different shapes such as a hole or a notch may be plotted in an outline of an object to be plotted. In the above-described preferred embodiment shown in FIGS. 1 to 3, the plotting work was performed by the one-stroke sketch in the clockwise direction. As is apparent, such a plotting work may be executed by the one-stroke sketch in the counter-clockwise direction. In the previous step 110, even if the oblique line segment is erroneously entered instead of the vertical or horizontal line segment, such an erroneous input can be corrected by inputting the angles of 0 and 90 degrees by utilizing the above-described angle input method.

Moreover, the CAD/CAM plotting system according to the invention may be highly efficiently utilized in such a manner that first, only rough outline of an object to be plotted is sketched by a non-skilled CAD operator, and thereafter, dimension lines/sizes are input by a skilled CAD operator.

While has been described in detail, according to the CAD/CAM plotting system of the invention, the particular advantages are provided that even a non-skilled CAD operator can readily perform the CAD/CAM plotting work, and thus, the CAD/CAM plotted drawings suitable for designing a die or mold can be performed under the higher workabilities and higher plotting precision.

Moreover, since a major work in designing a die is to transfer a shape of a component of an automobile, very simpler die designing operation can be achieved by introducing the CAD/CAM plotting system. In addition, not only absolute coordinate positions of a shape of an object to be plotted, but also data on line segments and end points can be input, so that the plotting system of the invention can be advanced to a new system where the mold dividing work is automatically performed.

In the above-described preferred embodiment, the dimensions of the object to be plotted were input one by one into the CAD system. Alternatively, instead of such a sequential dimension input operation, only the selected dimensions may be input to accomplish the sequential dimension input operation.

What is claimed is:

1. A CAD/CAM (computer-aided design/computer-aided manufacturing) plotting system wherein grapic data relating to an object to be plotted is sequentially input in accordance with instructions of a CAD/CAM program so as to plot a desired shape of said object on a display screen, comprising:

means for one-stroke-sketching a schematic outline of said object as said graphic data on the display screen;

means for pattern-recognizing said sketched schematic outline;

means for data-analyzing said pattern-recognized schematic outline;

means for determining coordinate points of said data-analyzed outline corresponding to correct dimension values of said object by inputting a predetermined number of dimension values thereof; and, means for automatically correcting said data-analyzed schematic outline with the correct dimension values based upon said determined coordinate points.

2. A CAD/CAM plotting system as claimed in claim 1, wherein said graphic data contains a point, a line, an arc and a size concerning said object to be plotted.

3. A CAD/CAM plotting system as claimed in claim 1, wherein said dimension values contain a distance between two coordinate points, a diameter, and an angle of said object.

4. A CAD/CAM plotting system as claimed in claim 1, wherein said one-stroke-sketching means includes a stylus pen and a keyboard.

5. A CAD/CAM plotting system as claimed in claim 4, further comprising a tablet.

6. A CAD/CAM plotting system as claimed in claim 1, further comprising a plotter for plotting said desired shape of the object displayed on said display screen.

7. A CAD/CAM (computer-aided design/computer-aided manufacturing) plotting method wherein graphic data relating to an object to be plotted is sequentially input in accordance with instructions of a CAD/CAM program so as to plot a desired shape of said object on a display screen, comprising the steps of:

one-stroke-sketching a schematic outline of said object as said graphic data on the display screen;

pattern-recognizing said one-stroke-sketched outline of said object;

data-analyzing said pattern-recognized outline of said object;

determining coordinate points of said data-analyzed outline corresponding to correct dimension values of said object by inputting a predetermined number of dimension values thereof, and, automatically correcting said data-analyzed outline of said object with the correct dimensions based upon said determined coordinate points.

8. A CAD/CAM plotting method as claimed in claim 7, wherein said graphic data contains a point, a line, an arc and a size concerning said object to be plotted.

9. A CAD/CAM plotting method as claimed in claim 7, wherein said dimension values contain a distance between two coordinate points, a diameter and an angle of said object.

* * * * *